United States Patent [19]

McDowell et al.

[11] 4,224,454

[45] Sep. 23, 1980

[54] PHOTOINITIATION SYSTEMS FOR FREE RADICAL POLYMERIZATION REACTIONS

[75] Inventors: John R. McDowell, Erie; Dennis D. Howard, Girard; Vincent J. Pascarella, Erie, all of Pa.

[73] Assignee: Lord Corporation, Erie, Pa.

[21] Appl. No.: 950,970

[22] Filed: Oct. 13, 1978

[51] Int. Cl.³ ............... C07C 143/78; C07C 125/065; C07C 125/073; C07C 125/077
[52] U.S. Cl. ........................................ 560/12; 560/25; 560/26; 560/115; 560/157; 560/158; 260/347.2; 204/159.18
[58] Field of Search ................... 560/115, 12, 25, 26, 560/157, 158

[56] References Cited

U.S. PATENT DOCUMENTS

| | | |
|---|---|---|
| 3,950,285 | 4/1976 | Wolge-Muth ..................... 260/18 |
| 4,065,627 | 12/1977 | Harrison .......................... 560/26 |
| 4,104,144 | 8/1978 | Weiss et al. .................. 204/159.23 |

FOREIGN PATENT DOCUMENTS

| | | | |
|---|---|---|---|
| 2264790 | 1/1975 | Fed. Rep. of Germany | 560/115 |
| 51-143406 | 12/1976 | Japan | 560/115 |

*Primary Examiner*—Robert Gerstl
*Attorney, Agent, or Firm*—John A. Gazewood; James W. Wright

[57] ABSTRACT

Acyloin urethans can be employed to effect photopolymerization of free radical-polymerizable compositions in inert and oxygen-containing atmospheres.

2 Claims, No Drawings

PHOTOINITIATION SYSTEMS FOR FREE RADICAL POLYMERIZATION REACTIONS

This invention relates to energy-curable compositions. More particularly, the invention relates to photopolymerization of free radical-polymerizable materials in inert and oxygen-containing atmospheres. The invention especially relates to acyloin urethan compounds and to photopolymerizable compositions containing such compounds.

The paint, coating and ink industries have accelerated the development of photocurable compositions, which contain substantially no inert volatile solvents, to meet increasing pressures to reduce solvent emissions and to conserve energy. Typically, such systems are composed of various reactive components which cure through a photoinitiated free radical polymerization mechanism. The reactive ingredients include low molecular weight polymeric materials usually referred to as oligomer(s), and monomeric materials, and can include mixtures of such materials. Formulations containing such materials generally contain photoinitiation compounds which accelerate the polymerization rate on exposure to actinic radiation. The function of such photoinitiation compounds is to absorb impinging energy in an amount sufficient to energize the compound to an electronically excited state which is effective to induce free radical polymerization of the reactive oligomeric and monomeric materials by one or more of several mechanisms, including direct energy transfer to a reactive site, by the formation of free radicals in a bimolecular process such as hydrogen abstraction, through the formation of a donor-acceptor complex between monomer and additive leading to ionic or radical species, or by decomposing directly to free radicals capable of initiating polymerization. The photoinitiator component should not adversely affect the viscosity, stability, odor or color of the photocurable compositions or the cured product and should be non-toxic and yield products after exposure to actinic radiation which are non-toxic, colorless and without objectionable odor. The photoinitiator component preferably should be inexpensive, be liquid for ease of handling and blending, as well as compatible with the formulation. Most importantly, the photoinitiator component must be effective to initiate polymerization in a controlled efficient manner and not at the same time produce products which could be effective to prematurely terminate the polymerization reaction.

A large number of compounds are known which are effective to promote free radical photopolymerization reactions. These include the benzoin ethers of primary and secondary alcohols, aromatic glyoxals such as phenyl glyoxal, diketones such as 1-phenyl-butane-1,2-dione, acetophenones such as 2,2-diethoxyacetophenone, and halogenated compounds such as polychlorinated diphenyl resins, inter alia. Notwithstanding the plethora of known compounds which are currently industrially acceptable as initiators for photopolymerization reactions, new and improved photoinitiators are required to meet increasingly sophisticated demands resulting from the increasing acceptance of photopolymerization techniques due to the inherently lower equipment costs, reduction of volatile emissions, and reduced energy consumption which attend their use.

The present invention provides a new class of acyloin derivatives which are effective to promote free radical photopolymerization reactions. The invention also provides novel photocatalyst systems which are effective to promote free radical photopolymerizations under inert atmospheres and in oxygen-containing environments. Further, the invention provides novel photocurable compositions which can be readily cured in either an inert atmosphere or in an oxygen-containing atmosphere by exposure to actinic radiation. The invention also provides processes for effecting photopolymerization of free radical-polymerizable polymeric and monomeric materials, including mixtures of such materials, to provide products having high gloss and low gloss finishes.

More particularly, there is provided in accordance with this invention novel acyloin urethan compounds which have been found effective to promote free radical photopolymerization reactions, such acyloin urethan compounds having the formulas

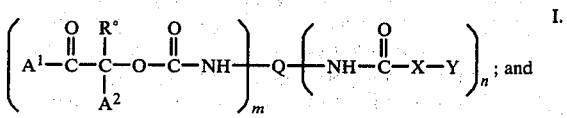

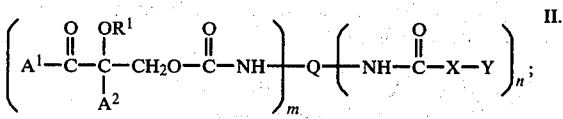

wherein:

$A^1$ and $A^2$ are the same or different and each is an unsubstituted or substituted benzenoid or non-benzenoid aromatic radical;

$R^0$ is hydrogen, or an aliphatic, cycloaliphatic or aromatic radical containing from 1 to 9 carbon atoms, or $—OR^2$, or

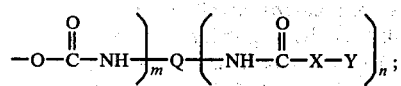

$R^1$ is hydrogen, or an aliphatic, cycloaliphatic or aromatic radical containing from 1 to 9 carbon atoms, or $—R^3—O—R^4$, or

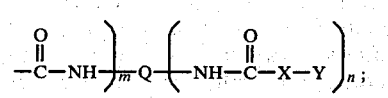

$R^2$ is hydrogen, or an aliphatic, cycloaliphatic or aromatic radical having from 1 to 9 carbon atoms, or $—R^3—O—R^4$, or

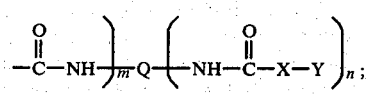

$R^3$ is a divalent aliphatic, cycloaliphatic or aromatic radical containing from 1 to 9 carbon atoms;

$R^4$ is hydrogen, or an aliphatic, cycloaliphatic, or aromatic radical having from 1 to 9 carbon atoms, or

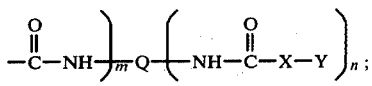

Q is the monovalent or polyvalent residue of a monomeric aliphatic, cycloaliphatic or aromatic isocyanate compound having at least one isocyanate group or of an isocyanate-functional polymeric material characterized by the presence of at least one isocyanate group, which residue remains after reaction of all isocyanate groups of such monomeric compounds and polymeric materials with one or more saturated or unsaturated compounds containing at least one isocyanate-reactive active hydrogen atom;

X is selected from the group consisting of —O—, —S—, and >NR$^5$, wherein R$^5$ is hydrogen or an alkyl group having from 1 to 9 carbon atoms;

Y is hydrogen or the organic residue of a saturated or unsaturated organic compound containing at least one isocyanate-reactive active hydrogen atom, wherein at least one such active hydrogen atom has been removed by reaction with an isocyanate moiety;

m is a number in the range of from 1 to f, where f is the total number of isocyanate groups per molecule of isocyanate compound; and n is equal to f−m.

The groups A$^1$ and A$^2$ individually are mononuclear or polynuclear benzenoid moieties having from 6 to 14 nuclear carbon atoms or non-benzenoid cyclic moieties which are recognized in the art as possessing the characteristics of a benzenoid aromatic moiety, such non-benzenoid moieites having from 4 to 13 nuclear or ring carbon atoms and up to two atoms of oxygen, sulfur, nitrogen or combinations thereof, which benzenoid and non-benzenoid cyclic moieties can carry one or more substituents selected from alkyl having from 1 to 12 carbon atoms, alkenyl having from 2 to 8 carbon atoms, phenyl, aralkyl or alkaryl having from 7 to 15 carbon atoms, alkoxy having from 1 to 10 carbon atoms, phenoxy, alkylthio having from 1 to 10 carbon atoms, phenylthio, alkanoyl having from 2 to 12 carbon atoms and halogen. The groups A$^1$ and A$^2$ together can form a fused aromatic ring system or can be linked together by a direct carbon-to-carbon link or through a divalent aliphatic chain having from 1 to 6 carbon atoms. Representative A$^1$ and A$^2$ groups, including fused and linked ring systems, include, without limitation thereto, phenyl, cumenyl, mesityl, tolyl, xylyl, naphthyl, fluorenyl, methoxyphenyl, chlorophenyl, thienyl, pyrolyl, benzo[b]thienyl, furyl, pyridyl, isobenzofuranyl, pyrazinyl, thiathrenyl, naphthylene, anthralene, biphenylene and methylenebisphenylene.

The novel acyloin urethan compounds of the present invention can be broadly described as the reaction product of an aromatic monoketone and a monomeric or polymeric compound having at least one isocyanate group and including the reaction product of an aromatic monoketone, a monomeric or polymeric compound having at least two isocyanate groups and a compound, preferably having at least one olefinically unsaturated moiety, containing at least one isocyanate-reactive active hydrogen atom.

More particularly the novel acyloin urethan compounds of this invention comprise the reaction product of at least one aromatic acyloin compound having the formula

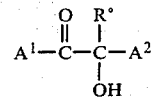

or

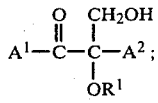

wherein A$^1$, A$^2$, R$^0$ and R$^1$ are as previously described; and at least one monomeric or polymeric isocyanate compound having the formula

   V.

wherein Q and f are as previously defined; and, optionally, at least one compound, different from said acyloin compound, having at least one active hydrogen moiety selected from the group consisting of —OH, —SH, —NH, and >NH and preferably having at least one unit of olefinic unsaturation. The reactants are preferably employed in chemically equivalent amounts, that is, the amount needed to furnish one active hydrogen atom for each isocyanate group present. The reaction is effected at standard conditions for the isocyanate-active hydrogen reaction and is continued to an end point corresponding to essentially 100 percent depletion of isocyanate functions. The end point of the reaction is readily attainable by any of several well known analytical methods, such as by titration. To ensure substantially complete reaction of all isocyanate functions, it can be advantageous to employ the acyloin compound in a slight excess, for example, 1 equivalent excess. When Y is other than hydrogen, the saturated or unsaturated compound having at least one active hydrogen atom can be prereacted with an excess of polyisocyanate to obtain an isocyanate-functional adduct or prepolymer which can then be reacted with the acyloin compound. Alternatively, the acyloin compound can be prereacted with excess polyisocyanate and the resulting isocyanate-functional aromatic acyloin urethan can be reacted with the active hydrogen compound, the latter compound preferably being present in a slight excess. Currently, it is preferred to combine all the reactants simultaneously and, after reaching the theoretical end point of the reaction to add a minor amount of a monoalcohol having from 1 to 4 carbon atoms to ensure complete reaction of all isocyanate groups. The reaction can be accomplished in the presence of absence of diluents. Preferred diluents include aliphatic, cycloaliphatic and aromatic compounds such as heptane, cyclohexane and toluene, but other diluents such as methyl ethyl ketone can be employed. Currently, it is preferred to effect the reaction in the substantial absence of any diluent compound other than a slight excess of acyloin compound.

Examples of suitable aromatic ketones which can be employed in forming acyloin urethans in accordance with this invention are benzoin, α-methyl-benzoin, α-methylol-benzoin methyl ether, α-methylol-benzoin isopropyl ether, 2,2'-dichlorobenzoin, 4,4'-dichlorobenzoin, 4,4'-dimethoxy benzoin, α-naphthojn and 2,2'-furoin. Substantially any aromatic acyloin compound having the formulas III or IV, including mixtures thereof can be employed in preparing the herein described aromatic acyloin urethan compounds.

Illustrative of the monomeric and polymeric monoisocyanates and polyisocyanates employed in preparing the new acyloin urethanes are hexyl isocyanate, cyclohexyl isocyanate, phenyl isocyanate, toluene diisocyanate, 4,4'-diphenyl diisocyanate, 4,4'-diphenylene methane diisocyanate, dianisidine diisocyanate, 1,5-naphthalene diisocyanate, 4,4'-diphenyl ether diisocyanate, p-phenylene diisocyanate, trimethylene diisocyanate, hexamethylene diisocyanate, nonamethylene diisocyanate, octadecamethylene diisocyanate, 2-chloropropane diisocyanate, 3-(dimethylamine)pentane diisocyanate, transvinylene diisocyanate, isocyanate prepolymers obtained by reacting excess monomeric polyisocyanates having at least two isocyanate groups with polyamines containing primary and secondary amine groups, polythiols having at least two mercaptan groups and polyols such as poly(alkylene oxide)glycols, polyesters, polyetheresters, polycaprolactones and alkane and alkene polyols having from 2 to 6 hydroxy groups.

Saturated and unsaturated compounds containing at least one isocyanate-reactive active hydrogen atom which can be employed in preparing acyloin urethans in accordance with the invention include, for example, methanol, isobutanol, 2-ethylhexanol, ethyl amine, ethyl mercaptan, allyl alcohol, methallyl alcohol, 1,4-butane diol, monovinyl ether, crotonol, ethylene glycol monoacrylate and monomethacrylate and monomeric acrylic compounds having the formula

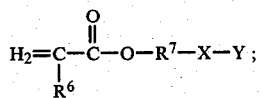

VI.

wherein $R^6$ is hydrogen, an alkyl radical having from 1 to 4 carbon atoms, $CH=CH-$ or halogen; $R^7$ is a divalent organic radical selected from the group consisting of alkylene having from 1 to 8 carbon atoms, alkyleneoxy units derived from poly(alkylene oxide)polyols having from 1 to 9 carbon atoms separating each pair of oxygen atoms, including mixtures thereof, phenylene and naphthylene; and X and Y are as previously defined. Poly(alkylene oxide) polyols which can be employed to form compounds having the formula VI are well known. Compounds having the formula VI are currently preferred.

The novel aromatic acyloin urethan compounds of the invention are particularly suitable for the photopolymerization of reaction monomers, oligomers and mixtures thereof, under inert atmospheres, such as nitrogen, when used alone. Generally, the acyloin urethan compounds will be employed in amounts in the range from 0.01 to 10, preferably 0.05 to 7, percent by weight, based on total weight of reactive constituents.

The novel photocatalyst systems of the present invention comprise an admixture of (1) at least one aromatic acyloin urethan compound having the formulas I and II and (2) at least one compound which promotes free radical polymerization through bimolecular photochemical reactions of the energy donor or energy transfer type, the hydrogen abstraction type, or by the formation of a donor-acceptor complex with monomers or additives leading to ionic or radical species. Such photocatalyst systems are particularly suited to effect photopolymerization in oxygen-containing atmospheres. It is well known that the presence of oxygen has an inhibiting effect on free radical polymerization reactions. The novel photocatalyst systems of this invention substantially negate such oxygen inhibition.

Compounds (2) which are effective to promote free radical addition polymerization through bimolecular photochemical reactions of the energy donor or transfer type or hydrogen abstraction type or by formation of a donor-acceptor complex with monomers or additives leading to ionic or radical species have been described as photosensitizers by at least one patentee, see Gruber U.S. Pat. No. 4,017,652, and, for the purpose of establishing some measure of consistency with respect to nomenclature, that description will be followed herein. With respect to photopolymerization processes, photosensitizers are not good initiators per se, but do readily absorb photon to produce an excited molecule which then acts through energy transfer, hydrogen abstraction or formation of a donor-acceptor complex with a second molecule to produce free radicals which are capable of initiating additional polymerization reactions.

Particularly preferred photosensitizers are aromatic ketones and aromatic aldehydes which can exist in a triplet state, especially such ketones and aldehydes which have a triplet energy in the range from 35 to 85, preferably 42 to 72, kilocalories per mole. Such photosensitizers are described in Gruber U.S. Pat. No. 4,017,652 and Osborn et al U.S. Pat. No. 3,759,807, the disclosures of both patents being incorporated herein by reference. The latter patent discloses representative activators which, in combination with photosensitizer compounds, act to form donor-acceptor complexes.

In forming the novel photocatalyst systems of this invention, the photosensitizers component (2) will generally comprise from 25 to 90, preferably 35 to 80, and especially 45 to 75, percent by weight of the photocatalyst system. The aromatic acyloin urethan component (1) is usually present in an amount in the range of 10 to 75, preferably 20 to 65, and especially 25 to 55, percent by weight of the photocatalyst system. The amount of photocatalyst system present in photopolymerizable compositions according to the invention is at least an effective amount, with the photosensitizer being usually present in an amount in the range from 0.01 to 50, preferably 0.1 to 15, parts by weight per 100 parts by weight of reactive constituents; and the aromatic acyloin urethan compounds being usually present in an amount in the range of 0.01 to 10, preferably 0.05 to 7, parts by weight per 100 parts by weight of reactive constituents.

Photocurable compositions in accordance with this invention which are curable by actinic radiation comprise, in addition to the novel aromatic acyloin urethan photoinitiators or the novel photocatalyst systems of the invention, at least one reactive monomer, at least one reactive polymer or a mixture of such polymers and monomers, with the latter mixtures being currently preferred. Preferably, reactive polymeric materials comprise at least one relatively low molecular weight polymer or oligomer.

Reactive oligomers which are preferentially employed in the photocurable compositions of this invention can include substantially any polymeric material characterized by the presence of at least one, preferably at least two, ethylenically unsaturated unit(s), and which is curable through a free radical-induced polymerization mechanism. Such polymeric materials will exhibit a molecular weight of at least 600, and preferably in the range of 900 to 4500, and preferably will have from 0.5 to 3 units of α,β-olefinic unsaturation per 1000 units of molecular weight. Representative of such materials are vinyl, acrylic, substituted acrylic, allylic, mercapto, fumaric, maleic and the like compounds having at least one unit of ethylenic unsaturation, including ethylenically unsaturated polyesters, polyethers, polyacrylates and substitute acrylates, epoxies, urethanes, silicones, amines, polyamides, and the like. A preferred class of polymeric materials includes the acrylated resins, such as acrylated silicone oil, acrylated polyesters, acrylated polyethers, acrylated polyurethanes, acrylated polyamides, acrylated polycaprolactones, acrylated soybean oil, acrylic and substituted acrylic resins, acrylated epoxies and acrylated urea resins, with acrylated polyruethane resins being particularly preferred. Such ethylenically unsaturated materials, including their manufacture, are well known, see Burlant et al U.S. Pat. No. 3,509,234, Smith et al U.S. Pat. No. 3,700,645 and Boranian et al U.S. Pat. No. 3,924,023.

A particularly preferred class of polymeric materials comprise unsaturated urethane and analogous to urethane resins which are characterized by the presence of at least one ethylenically unsaturated unit having the structure —C=C, said unsaturated resins comprising the reaction product of:

(i) at least one organic isocyanate compound characterized by the presence of at least two reactive isocyanate groups;

(ii) from about 30 to 100 mol percent of at least one polymeric material characterized by the presence of at least two isocyanate-reactive active hydrogen groups;

(iii) from about 70 to zero mol percent of at least one monomeric chainextending compound characterized by the presence of at least two isocyanate-reactive active hydrogen groups; and (iv) at least one addition-polymerizable unsaturated monomeric compound having a single isocyanate-reactive active hydrogen group;

the mol percents of (ii) and (iii) being based on total mols of (ii) and (iii);

said isocyanate compound (i) being present in an amount sufficient to provide an NCO:active hydrogen ratio greater than 1:1, preferably at least 1.05:1, and more preferably in the range 2.3–5:1, with respect to the active hydrogen groups of (ii) and (iii);

said addition-polymerizable unsaturated monomeric compound (iv) being present in an amount sufficient to provide at least one molar equivalent of active hydrogen group per mol of available isocyanate moiety. Such preferred unsaturated resins will have a residual reactive isocyanate moiety, based on total weight of the resin, of not more than one, preferably not more than 0.1, percent by weight. The ethylenically unsaturated unit is preferably a terminal group having the structure $CH_2=CH-$. Such resins have the further characteristic features (a) the polymerizable ethylenically unsaturated group is separated from the main or backbone carbon-carbon chain by at least one, preferably at least two, urethane or analogous group(s) or combination of such groups;

(b) a molecular weight of at least 600, preferably 900 to 4500; and (c) the presence of 0.5 to 3 ethylenically unsaturated units per 1000 units of molecular weight.

An especially preferred group of reactive oligomers comprises the reaction product of (i) at least one organic isocyanate compound having at least two isocyanate groups;

(ii) at least one poly(alkylene oxide)polyol; and (iii) at least one unsaturated addition-polymerizable monomeric compound having a single isocyanate-reactive active hydrogen group;

there being present an excess of isocyanate compound with respect to the hydroxyl groups of said poly(alkylene oxide)polyol;

said unsaturated addition-polymerizable monomeric compound having a single isocyanate-reactive active hydrogen group being present in an amount sufficient to provide at least one molar equivalent of active hydrogen group with respect to isocyanate reactivity.

Active hydrogen-containing precursors which can be employed in preparing the preferred ethylenically unsaturated reactive oligomers can be linear or branched and include any polymeric material having at least two isocyanate-reactive active hydrogen groups per molecule as determined by the Zerewitinoff method. Representative active hydrogen-containing polymeric compounds include polyethers, such as polyethylene glycol and polytetramethylene glycol; hydroxy-terminated polyalkylene esters of aliphatic, cycloaliphatic and aromatic diacids; esters of polyhydric alcohols and hydroxy fatty acids; alkyd resins containing hydroxyl end groups; hydroxyl-terminated polybutadiene resins; hydroxylated acrylic and substituted acrylic resins; hydroxyl-terminated vinyl resins; polycaprolactones; polythiols; polyamine and polyamide resins and the like. Currently, hydroxyl-containing compounds are preferred.

Organic isocyanate compounds suitable for use in forming the preferred unsaturated resins in accordance with the invention can be any organic isocyanate compound having at least two reactive isocyanate groups. Included within the purview of such isocyanate compounds are aliphatic, cycloaliphatic, and aromatic polyisocyanates as these terms are generally interpreted in the art. Thus, it will be appreciated that any of the known polyisocyanates such as alkyl and alkylene polyisocyanates, cycloalkyl and cycloalkylene, polyisocyanates, and aryl and arylene polyisocyanates, including variants thereof, such as alkylene cycloalkylene and alkylene arylene polyisocyanates, can be employed. Suitable polyisocyanates include, without limitation, tolylene-2, 4-diisocyanate, 2,2,4-trimethylhexamethylene-1,6-diisocyanate, hexamethylene-1,6-diisocyanate, diphenylmethane-4,4'-diisocyanate, triphenylmethane-4,4',4''-triisocyanate, polymethylene poly(phenyl isocyanate), m-phenylene diisocyanate, 2,6-tolylene diisocyanate, 1,5-naphthalene diisocyanate, naphthalene-1,4-diisocyanate, diphenylene-4,4'-diisocyanate, 3,3'-bitolylene-4,4'-diisocyanate, 1,4-cyclohexylene dimethylene diisocyanate, xylene-1,4-diisocyanate, cyclohexyl-1,4-diisocyanate, 4,4'-methylene-bis(cyclohexyl isocyanate), 3,3'-diphenyl methane-4,4'-diisocyanate, isophorone diisocyanate, dimer isocyanates such as the dimer of tolylene diisocyanae, and the product obtained by reacting trimethylol propane and 2,4-tolylene diisocyanate in a molar ratio of 1:3. Currently, aliphatic and cycloaliphatic diisocyanates are preferred.

Essentially any monomeric compound having at least two isocyanate-reactive active hydrogen groups which is known to or can be expected to function as a chain-extender to increase molecular weight, introduce chain-branching, affect flexibility and the like in reactions between isocyanate compounds and compounds containing active hydrogen groups can be employed in forming the preferred unsaturated resins of the invention. Such chain-extending compounds are well known in the art and require no detailed elaboration. Preferably, the active hydrogen groups of such chain-extending compounds will be selected from among hydroxyl, thiol, primary amine and secondary amine, including mixtures of such groups, with hydroxyl and primary amine being currently preferred. The chain-extending compounds will generally have molecular weights of less than 25, and preferably between 62 and 225. Especially preferred chain-extending compounds include aliphatic diols free of alkyl substitution and aliphatic triols having from 2 to 14 carbon atoms. Representative chain-extending compounds include water, ethylene glycol, 1,3-propane diol, 1,4-butane diol, 1,6-hexane diol, trimethylol propane, triethylene glycol, glycerol, 1,2-propane-bis(4-cyclohexyl amine), methane-bis(4-cyclohexyl amine), N,N'-dimethyl-o-phenylene diamine, 1,3-propane dithiol, monoethanol amine, and amino ethyl mercaptan.

Suitable addition-polymerizable monomeric compounds having a single ethylenically unsaturated unit and a single isocyanate-reactive hydroxyl active hydrogen group which can be used in the preferred compositions of this invention include 2-hydroxyethyl acrylate, 3-hydroxypropyl acrylate, 4-hydroxybutyl acrylate, 8-hydroxyoctyl acrylate, 12-hydroxydodecanyl acrylate, 6-hydroxyhexyl oleate, hydroxy neopentyl acrylate, hydroxyneopentyl linoleate, hydroxyethyl-3-cinnamyloyloxypropyl acrylate, hydroxyethyl vinyl ether, and the corresponding methacrylates, and allyl alcohol.

The preferred unsaturated resins of the invention can be prepared by any of several reaction routes. For example, the isocyanate compound, the polymeric material having at least two active hydrogen groups, the addition-polymerizable monomeric compound having a single ethylenically unsaturated group and a single isocyanate-reactive active hydrogen group and, when used, the chain-extending compound can be simultaneously reacted together. Currently, it is preferred to form the unsaturated resins in two or more steps comprising (1) reacting the isocyanate compound, the polymeric material, and, if used, the chain-extending compound to provide an isocyanate-functional prepolymer and (2) reacting the prepolymer with the addition-polymerizable unsaturated monomeric compound having a single isocyanate-reactive active hydrogen group. The reaction is terminated at the desired state of viscosity, which will generally correspond to a molecular weight of at least 600, preferably 900 to 4500, which is usually a function of an end-use requirement. Any excess isocyanate moieties can be capped if desired or necessary by the addition of monofunctional chain-terminating agents, such as monoalcohols and monoamines, preferably having from one to 4 carbon atoms, and morpholine. Regardless of the process employed, it is preferred to conduct the reaction in its entirety in the presence of a diluent phase which is copolymerizable with the unsaturated resin product but is inert with respect to the manufacture of the resin.

Reactive diluent systems which can be employed in the addition-polymerizable compositions of this invention include any of such systems which have been or are being used for this purpose. Broadly, suitable reactive diluent systems comprise at least one unsaturated addition-polymerizable monomer which is copolymerizable with the unsaturated resin. The reactive diluent can be monofunctional or polyfunctional. A single polyfunctional diluent can be used, as can mixtures thereof, or a combination of one or more monofunctional reactive diluents can be used. Such combinations of mono- and polyfunctional reactive diluents are currently preferred. Generally, the reactive diluent system will comprise from about 10 to about 75, preferably about 25 to about 50, weight percent, based on total weight of unsaturated resin and reactive diluent, of the addition-polymerizable compositions of the invention. Particularly preferred reactive diluents are unsaturated addition-polymerizable monofunctional monomeric compounds selected from the group consisting of esters having the general formula

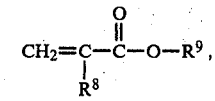

wherein $R^8$ is hydrogen or methyl and $R^9$ is an aliphatic or cycloaliphatic, preferably alkyl or cycloalkyl, group having from 6 to 18, preferably 6 to 9 carbon atoms. Representative of such preferred reactive monomeric diluents, without limitation thereof, are hexyl acrylate, cyclohexyl acrylate, 2-ethylhexyl acrylate, octyl acrylate, nonyl acrylate, stearyl acrylate, and the corresponding methacrylates. It is preferred that at least 50 percent by weight of the reactive diluent comprise one or more of these preferred esters. Illustrative of other reactive monofunctional and polyfunctional monomeric diluents which can be employed are styrene, methyl methacrylate, butyl acrylate, isobutyl acrylate, 2-phenoxy acrylate, ethoxyethoxyethyl acrylate, 2-methoxyethyl acrylate, 2-(N,N'-diethylamino)-ethyl acrylate, the corresponding methacrylates, acrylonitrile, methyl acrylonitrile, methacrylamide, neopentyl glycol diacrylate, ethylene glycol diacrylate, hexylene glycol diacrylate, diethylene glycol diacrylate, trimethylol propane triacrylate, pentaerythritol di-, tri-, or tetra-acrylate, the corresponding methacrylates, vinyl pyrrolidone, and the like. Reactive diluent systems are well known to those skilled in the art of radiation curing and the selection of an appropriate diluent system is any given instance is sufficiently encompassed by such knowledge as to required no further discussion here.

It has also been found that the inclusion of chain transfer agents in the energy-curable compositions employed in the practice of this invention can beneficially affect ultimate cured film properties. Substantially any of the known chain transfer agents can be so employed. Generally, such compounds, when utilized, will be employed at levels not exceeding about 15 parts by weight, per 100 parts of combined weight of unsaturated urethane oligomer and reactive diluent, and preferably will be employed in the range from about 0.1 to about 5 parts by weight. Representative chain transfer agents for addition polymerization reactions include benzene; toluene; ethylbenzene, isopropylbenzene; t-butylbenzene; cyclohexane; heptane; n-butyl chloride; n-butyl bromide; n-butyl iodide; n-butyl alcohol; n-butyl disulfide; acetone; acetic acid; chloroform; carbon tetrachloride; carbon tetrabromide; butylamine; triethylamine; t-butyl mercaptan; n-butyl mercaptan; tertiary aliphatic amines such as triethanolamine and t-butyl diethanolamine; 2-ethylhexane-1,3-dithiol; 1,10-dicanedithiol; 1,2-ethanedithiol; 1,3-propanedithiol; 1,6-octanedithiol; 1,8-octanedithiol; 1,10-octadecanedithiol; m-benzenedithiol; bis-(2-mercaptoethyl)sulfide; p-xylylenedithiol; pentaerythritol tetra-7-mercaptoheptanoate; mercapto-acetic acid triglyceride; pentanethiol; dodecanothiol; glycol mercaptoacetate; ethyl mercaptoacetate; and esters of thioglycolic and mercaptopropionic acids. Preferred chain transfer agents include both monothiols and polythiols; and polythiols having a molecular weight in the range from about 95 to about 20,000 and having the general formula $$R^{10}(SH)_p,$$

wherein $R^{10}$ is a polyvalent organic moiety and p is at least 2, being especially preferred. Particularly preferred polythiols include glycerol trithioglycolate; pentaerythritol tetrathioglycolate; pentaerythritol tetrakis($\beta$-mercaptopropionate); trimethylolpropane tris(-thioglycolate); trimethylolpropane tris($\beta$-mercaptopropionate); ethylene glycol bis(thioglycolate); ethylene glycol bis($\beta$-mercaptopropionate) and poly(propylene oxide ether)glycol bis($\beta$-mercaptopropionate).

Preferably, the coating compositions of the invention will also contain from about 0.1 to about 10 parts by weight, per 100 parts combined weight of unsaturated oligomer and reactive diluent, of acrylic acid.

The invention compositions can also include pigments, fillers, wetting agents, flow control agents, and other additives typically present in coating compositions. In some applications, the inclusive of minor amounts of inert solvents can be advantageous. Such additive materials are well known to those skilled in the art and do not require further elaboration herein. Also well known are the concentrations at which such additives are used.

The coating compositions of this invention are prepared by conventional methods such as blending. The compositions can be applied to wood, metal, fabric and plastic substrates in an economical and efficient manner using conventional industrial techniques and provide smooth, uniform films which are rapidly cured to dried films having excellent physical and chemical properties.

The coating compositions of this invention can be applied and cured by any of the conventional known methods. Application can be by roll coating, curtain coating, airless spray, dipping or by any other procedure. The cure can be effected by exposure to actinic radiation, especially ultraviolet light radiation. The equipment utilized for curing, as well as the appropriate time for curing, and the conditions under which the curing is effected are well known to those skilled in the art of radiation curing and do not require further elaboration herein. The herein described coating compositions are rapidly cured to hard mar-resistant films under inert atmospheres. The compositions containing the photocatalyst systems are especially suited for curing in the presence of molecular oxygen at a rate at least equivalent to that obtained under inert atmospheres. Generally, the cured films will provide a high gloss finish. Low gloss finishes can be obtained by employing the herein described compositions containing the aromatic acyloin urethan compounds in the process of Hahn U.S. Pat. No. 3,918,393, the disclosure of which is incorporated herein by reference. Compositions containing the novel photocatalyst systems of the invention are especially suited for obtaining low gloss finishes by the recently developed "Gradient Intensity Cure" method. According to this method, a flatted or low gloss finish is produced by subjecting the photopolymerizable composition to actinic light in an oxygen-containing atmosphere at a first intensity level and a first exposure time until the composition is completely cured except for the surface thereof and subsequently subjecting such composition having such uncured surface to actinic light at a second intensity level and a second exposure time to completely cure said surface, wherein said combination of second intensity and second exposure time is selected from the group consisting of (i) said second intensity is substantially equal to said first intensity and said second exposure time is greater than said first exposure time;

(ii) said second intensity is greater than said first intensity, and said second exposure time is substantially equal to said first exposure time;

(iii) said second intensity is greater than said first intensity, and said second exposure time is less than said first exposure time; and (iv) said second intensity is greater than said first intensity, and said second exposure time is greater than said first exposure time.

In accordance with the "Gradient Intensity Cure" method, the coating is first irradiated by actinic light in an oxygen-containing atmosphere, with air being the preferred atmosphere, at a first intensity level which is sufficient to energize the photoinitiator component of the photocatalyst system and initiate free radical polymerization of the bulk of the coating. While actinic radiation has an emission spectra which is sufficient to energize also the photosensitizer component of the photocatalyst system, both the amount of photosensitizer and the first intensity level are selected to ensure that the free radicals produced from such energizing of the photosensitizer are insufficient to override completely oxygen inhibition at the film surface. The surface of the coating is thus inhibited at the first intensity level by the oxygen present in the curing atmosphere at least to the extent that the surface is incompletely polymerized and remains wet to the touch while the bulk or underneath portion of the coating is cured to a hard polymer.

Following the exposure at the first intensity level, the wet film is irradiated by actinic light in an oxygen-containing atmosphere, with air again being the preferred atmosphere, at a second intensity level which is not only higher than that initially employed but also is effective to energize the photosensitizer component of the photocatalyst system. This second intensity level must be sufficiently high to ensure that the gross amount of free radicals resulting from such energization of photosensitizer is effective to override oxygen inhibition at the film surface and initiate free radical polymerization of and effect complete cure of the wet surface layer. Properties such as stain, solvent and abrasion resistance are substantially identical in comparison to formulations cured according to the two-stage air-inert environment process of Hahn U.S. Pat. No. 3,918,393, or cured in a single stage at constant intensity in either an inert atmosphere or an oxygen-containing atmosphere.

The actinic energy which is preferred for curing the herein-described coating composition is ultra violet light or irradiation in the near and far ultraviolet spectrum, i.e., having wavelengths in the range of 200 nm (nanometers) to 400 nm. Various suitable sources of such ultraviolet light or radiation are available in the art including, by way of example, mercury vapor arc lamps, carbon arcs, plasma arc torches, ultraviolet lasers, and pulsed xenon lamps, with medium pressure mercury arc vapor lamps being currently preferred.

The invention is illustrated in greater detail by the following Examples, but these examples are not to be construed as limiting the present invention. All parts, percentages and the like are in parts by weight, unless otherwise indicated.

EXAMPLE I

A reaction vessel equipped with temperature sensing means, cooling means, reflexing means and agitation means is charged with 21.2 g benzoin, 122.5 g tetrahydrofuran and 0.02 g dibutyltin dilaurate. To this reaction mixture there is added 19.7 g tosyl isocyanate in a sequential manner so as to maintain the reaction temperature below 40° C. The reaction is terminated at an -NCO content below 0.1%. The reaction product is a strong yellow solution at a 50% total solids content. The reaction product is recrystallized from tetrahydrofuran and confirmed as a 2-p-toluene sulfonyl-urethan-1,2-diphenyl ethanone ($A^1$ and $A^2$ are phenyl, $R^o$ is hydrogen, Q is

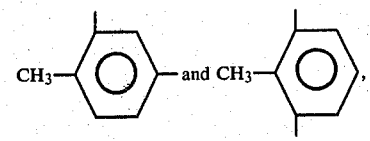

m is 1, and n is zero).
By elemental analysis:

| Element | Percent | |
|---|---|---|
| | Theoretical | Found |
| C | 64.62 | 64.40 |
| H | 4.66 | 4.88 |
| N | 3.42 | 3.41 |
| S | 7.77 | 7.80 |
| O | 19.53 | 19.51 |

| Element | Percent | |
|---|---|---|
| | Theoretical | Found |
| | 100.00 | 100.00 |

EXAMPLE II

Analogously to Example 1, 0.1 mol benzoin and 0.05 mol toluene diisocyanate gave a mixture of

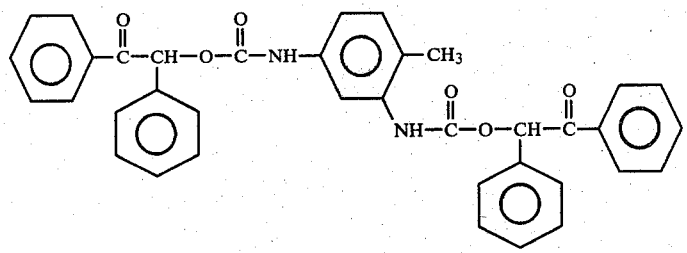

and

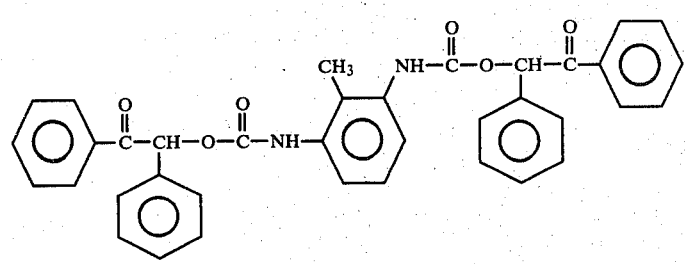

($A^1$ and $A^2$ are phenyl, $R^o$ is hydrogen, Q is

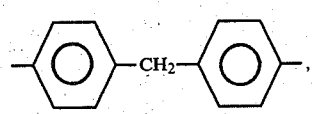

m is 2 and n is zero).

EXAMPLE III

Following the procedure of Example I, an acyloin urethan compound having the formula

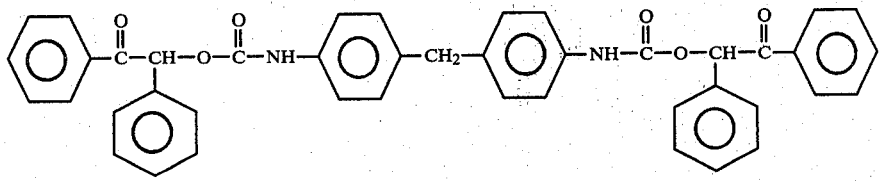

($A^1$ and $A^2$ are phenyl, $R^o$ is hydrogen, Q is

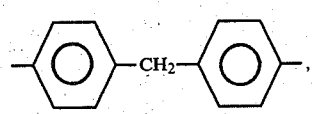

m is 2 and n is zero) is prepared by reacting 0.2 mol benzoin and 0.1 mol 4,4'-methylenebis(phenyl isocyanate) in tetrahydrofuran at 25% total solids content (TSC).

EXAMPLE IV

Analogously to Example I, 0.2 mol benzoin and 0.1 mol 4,4'-methylenebis-(cyclohexyl isocyanate) in dimethylformamide at 50% TSC are reacted to form an acyloin urethan compound having the structure

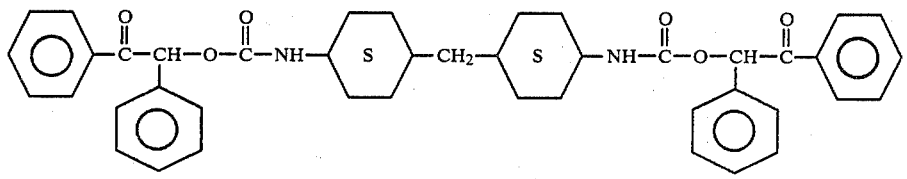

($A^1$ and $A^2$ are phenyl, $R^o$ is hydrogen, Q is

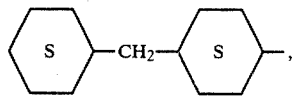

m is 2 and n is zero).

EXAMPLE V

Following the procedure of Example I, 0.2 mol benzoin and 0.1 toluene diisocyanate are reacted in tetrahydrofuran at 50% TSC to an endpoint of 2.70% residual isocyanate content. To the reaction mixture there is added 0.2 mol 2-hydroxyethyl acrylate and the reaction is terminated when the residual isocyanate content is essentially 0%. The acyloin urethan reaction product comprises a mixture of compounds having the formulas

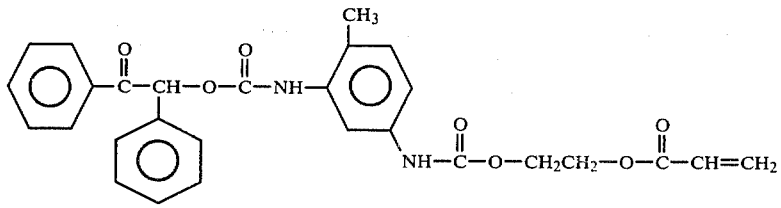

($A^1$ and $A^2$ are phenyl, $R^o$ is hydrogen, Q is

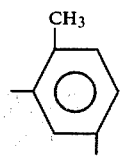

X is oxygen, Y is $$-CH_2CH_2-O-\overset{\overset{O}{\|}}{C}-CH=CH_2,$$

m is 1 and n is 1); and

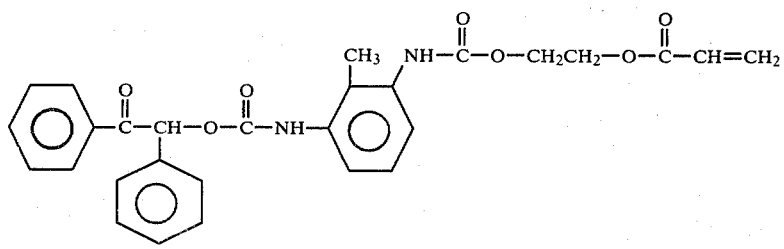

($A^1$ and $A^2$ are phenyl, $R^o$ is hydrogen, Q is $CH_3$

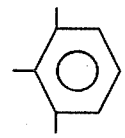

X is oxygen, Y is $$-CH_2CH_2-O-\overset{\overset{O}{\|}}{C}-CH=CH,$$

m is 1 and n is 1).

EXAMPLE VI

Analogously to Example I, 0.1 mol benzoin, 0.1 mol 4,4'-methylenebis-(cyclohexyl isocyanate) and 0.1 mol hydroxypropyl acrylate are reacted in 2-ethylhexyl acrylate at 33.3% TSC to give an acyloin urethan reaction product having the formula

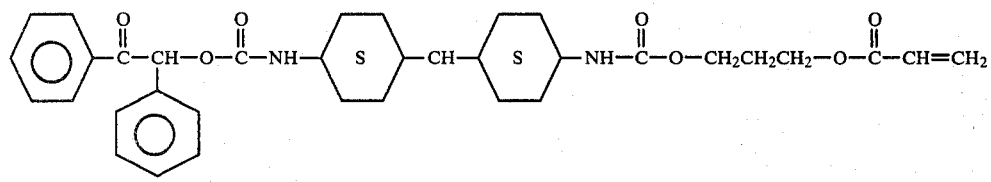

(A¹ and A² are phenyl, R⁰ is hydrogen, Q is

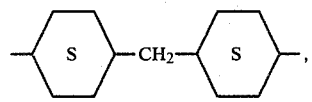

X is oxygen

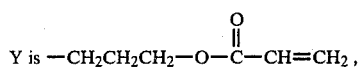

m is 1 and n is 1).

EXAMPLE VII

Following the procedure of Example I, 0.1 mol 4,4'-methylene-bis(cyclohexyl isocyanate) and 0.1 mol hydroxypropyl methacrylate at 100 TSC are contacted to form an isocyanate-functional adduct. To the reaction mixture containing such isocyanate-functional unsaturated adduct there is added 0.1 mol benzoin. The resulting reaction product is an acyloin urethan compound having the formula

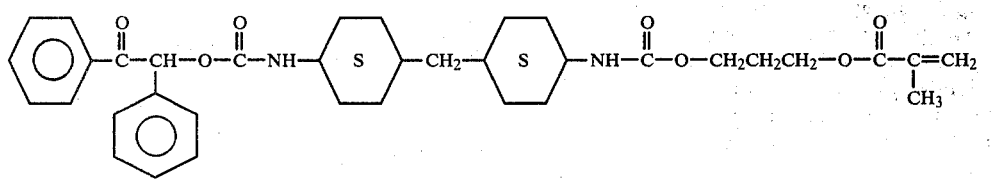

(A¹ and A² are phenyl, R⁰ is hydrogen, Q is

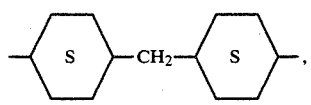

X is oxygen, Y

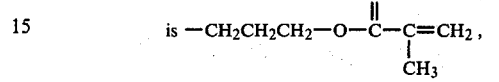

m is 1 and n is 1).

EXAMPLE VIII

Following the procedure of Example I, 0.1 mol isophorone diisocyanate and 0.2 mol benzoin are reacted in tetrahydrofuran at 25% TSC to afford the acyloin urethan compound having the structure

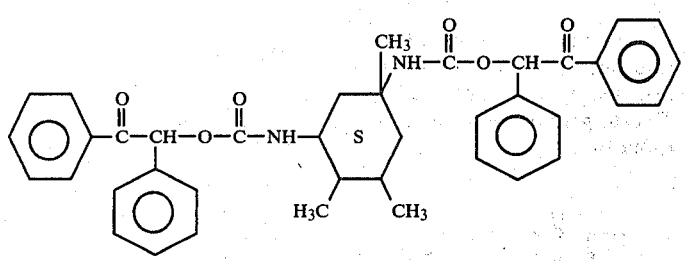

(A¹ and A² are phenyl, R⁰ is hydrogen, Q is

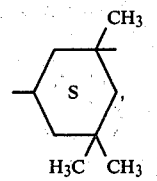

m is 2 and n is zero).

EXAMPLE IX

Analogously to Example I, 21.2 parts by weight benzoin and 26.7 parts by weight hexamethylene diisocyanate biuret (NCO:OH::1:1) are reacted in tetrahydrofuran to give an acyloin urethan compound having the structure

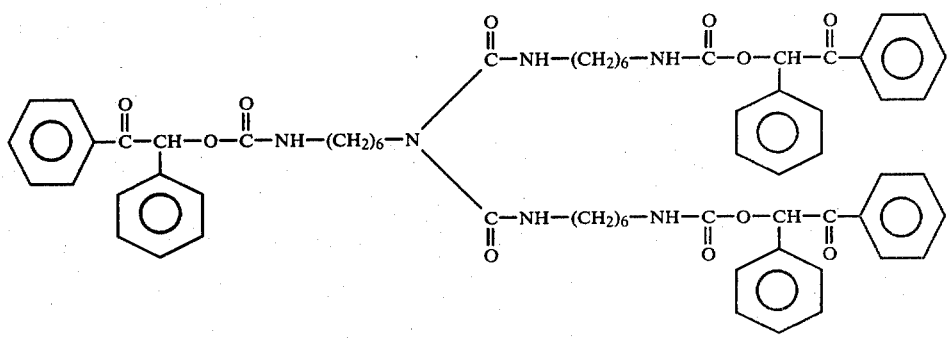

($A^1$ and $A^2$ are phenyl, $R^o$ is hydrogen, Q is

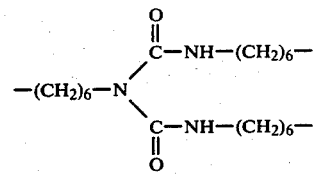

m is 3 and n is zero).

EXAMPLE X

Following the procedure of Example I, 0.1 mol furoin and 0.1 mol p-toluenesulfonyl isocyanate (tosyl isocyanate) are reacted in tetrahydrofuran at 33.3% TSC to give the acyloin urethan compound having the formula

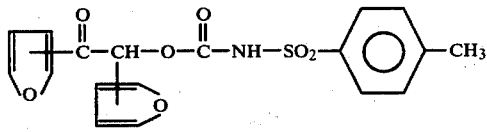

($A^1$ and $A^2$ are furyl, $R^o$ is hydrogen, Q is

m is 1 and n is zero).

EXAMPLE XI

Photosensitizer photoinitiator blends are prepared according to the inventive concept as follows:

Following the procedure of Example I, one mol 4,4'-methylene-bis(cyclohexyl isocyanate) and 2 mols benzoin are reacted in situ in benzophenone at 25% TSC to give a mixture of the acyloin urethan photoinitiator having the formula

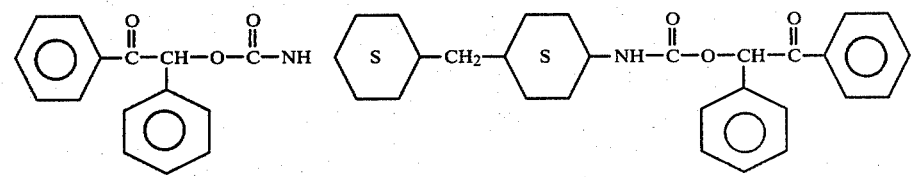

($A^1$ and $A^2$ are phenyl, $R^o$ is hydrogen, Q is

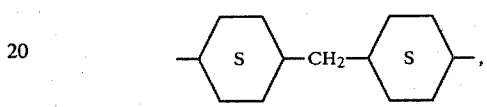

m is 2 and n is zero) in benzophenone photosensitizer.

Alternatively, and preferably, photoinitiator-photosensitizer blends are prepared by mechanically blending, as by ball mixing, the acyloin urethan compound photoinitiator prepared by the procedure of Example IV with benzophenone photosensitizer in ratios, by weight, of photoinitiator:photosensitizer of 1:1, 1:2, 1:3, and 1:4.

EXAMPLE XII

An unsaturated oligomer syrup is prepared by reacting 1 mol of polyester polyol (1,3-butylene glycol/-glycerine/adipic acid/isophthalic acid condensation product) having a hydroxyl functionality of 2.3 and 3.5 mols 4,4'-methylene-bis (cyclohexyl isocyanate) in 2-ethylhexyl acrylate diluent. The resulting isocyanate-functional oligomer is fully capped with 2-hydroxyethyl acrylate to afford a syrup of addition-polymerizable unsaturated oligomer in 2-ethylhexyl acrylate reactive monomer diluent at 70 percent resin solids. The unsaturated oligomer has a molecular weight ca. 1,300 and approximately 1.8 units of vinyl unsaturation per 1000 units of molecular weight. The syrup is identified hereinafter as Syrup A.

In an analogous manner, 1 mol of poly(tetramethylene oxide) diol is reacted with an excess of 4,4'-methylene-bis(cyclohexyl isocyanate) in 2-ethylhexyl acrylate to form an isocyanate-functional prepolymer in 2-ethylhexyl acrylate. The prepolymer is reacted with 2-hydroxyethyl acrylate in the presence of 2-ethylhexyl acrylate reactive monomer diluent to form a syrup of acrylated urethane oligomer having at least two terminal ethylenically unsaturated groups and substantially no free isocyanate functions, in 2-ethylhexyl acrylate reactive monomer diluent at 70 percent resin solids. The syrup is identified hereinafter as Syrup B.

EXAMPLE XIII

A series of coating compositions are prepared as follows

| Composition | A | B | C | D | E | F |
|---|---|---|---|---|---|---|
| Syrup B | 100 | 100 | 100 | 100 | 100 | 100 |
| 2-Ethylhexyl acrylate | 15 | 15 | 15 | 15 | 15 | 15 |
| Benzophenone | 3 | 3 | 0 | 3 | 3 | 3 |
| Benzoin isobutyl ether | 1 | — | — | — | — | — |
| Acyloin urethan | | | | | | |
| Example IV | — | 1 | 1 | — | — | — |
| Example V | — | — | — | 1 | — | — |
| Example I | — | — | — | — | 2 | — |
| Example X | — | — | — | — | — | 3 |

The compositions are coated onto aluminum substrates to provide a wet film thickness of 1.5 mil. The thus-coated substrates are cured by exposure to ultraviolet light at an intensity of 80 W/cm at a line speed of 15.2 meters/minute. All compositions cure in a nitrogen environment to a mar-resistant surface in one pass. In an oxygen environment the state-of-the-art control composition A (U.S. Pat. No. 4,017,652) and invention compositions B and E cure to a mar-resistant surface in one pass. Invention composition D requires two passes for cure in an oxygen environment, while invention composition C, which contains no photosensitizer requires three passes for cure in an oxygen environment, and invention composition F requires five passes for cure in an oxygen environment. Film properties of all compositions, whether cured in nitrogen or oxygen, are substantially identical. With the exception of composition F, all cured films are clear, that is, not discolored.

EXAMPLE XIV

Using Syrup A of Example XII, photocurable compositions are prepared from the following ingredients:

| Composition | A | B |
|---|---|---|
| Syrup A | 79.5 | 79.5 |
| 2-Ethylhexyl acrylate | 7.9 | 7.9 |
| Silica | 8.2 | 8.2 |
| Acrylic acid | 1.6 | 1.6 |
| v-Methacryloxypropyltrimethoxy silane | 0.6 | 0.6 |
| Benzophenone | 1.0 | 1.0 |
| Benzoin isobutyl ether | 1.5 | — |
| Acyloin urethane of Example I | — | 1.5 |

The resulting coating compositions are applied by direct roll coater to vinyl sheet goods. The coatings are cured by exposure to ultraviolet irradiation as follows:

(1) in air using a source consisting of 2 medium pressure mercury vapor lamps at a first intensity of 40 watts/cm at a transport speed of 10 meters/minute and then to a second and higher intensity of 80 watts/cm provided by a power source consisting of 3 medium pressure mercury vapor lamps at a transport speed of 10 meters/minute;

(2) in nitrogen using a power source consisting of 2 medium pressure mercury vapor lamps at an intensity of 40 watts/cm at a transport speed of 10 meters/minute;

(3) same as (2), except that the power source consists of 3 medium pressure mercury vapor lamps at an intensity of 80 watts/cm;

(4) in air using a power source consisting of 2 medium pressure mercury vapor lamps at an intensity of 40 watts/cm at a transport speed of 10 meters/minute; and then in nitrogen using the same power source at the same transport speed; and (5) same as (4), except that the power source consists of 3 medium pressure mercury vapor lamps at an intensity of 80 watts/cm.

The physical properties of the coatings are substantially equivalent. The coatings cured by methods 1 (gradient intensity method of gloss control) and 4 (dual cure method of gloss control, Hahn U.S. Pat. No. 3,918,393) have a reduced gloss of 45–50 as measured by the 60° gloss meter, while the coatings cured by methods 2, 3, and 5 have a high gloss finish.

The 60 gloss meter test is a standard test for gloss wherein light is reflected off the coating at a 60° angle and the percent reflectance is measured. The test procedure is fully detailed in ASTM standard D-523-67.

EXAMPLE XV

Photosensitizer/photoinitiator blends prepared according to the in situ cook method and mechanical blending methods of Example XI at a ratio of 1 part by weight photoinitiator to 3 parts by weight photosensitizer are employed to prepare the following coating compositions:

| Composition | A | B | C |
|---|---|---|---|
| Syrup B | 100 | 100 | 100 |
| 2-Ethylhexyl acrylate | 7 | 7 | 7 |
| Pentaerythritol triacrylate | 5 | 5 | 5 |
| Benzophenone | 3 | 1.5 | 1.5 |
| Benzoin isobutyl ether | 1 | — | — |
| In situ cook blend of benzophenone photosensitizer and benzoin/4,4'-methylene-bis-(cyclohexyl isocyanate) acyloin urethan photoinitiator | — | 2 | — |
| Mechanical blend of benzophenone photosensitizer and benzoin/4,4'-methylene-bis-(cyclohexyl isocyanate) acyloin urethan photoinitiator | — | — | 2 |

The compositions are coated onto aluminum substrates to provide a wet film thickness of 1.5 mil. The coated substrates are cured by exposure in an oxygen atmosphere to ultraviolet light at an intensity of 80 watts/cm at a line speed of 15.2 meter/minute, employing 3 medium pressure mercury vapor lamps as a power source. The compositions cure to colorless mar-resistant surfaces in one pass.

EXAMPLE XVI

The acyloin urethane compositions of Examples 1 to 10 are employed to prepare coating compositions as follows:

| Composition | 1 | 2 | 3 | 4 | 5 | 6 | 7 | 8 | 9 | 10 | 11 |
|---|---|---|---|---|---|---|---|---|---|---|---|
| Syrup B | 100 | 100 | 100 | 100 | 100 | 100 | 100 | 100 | 100 | 100 | 100 |
| 2-Ethylhexyl acrylate | 7 | 7 | 7 | 7 | 7 | 7 | 7 | 7 | 7 | 7 | 7 |
| Pentaerythritol triacrylate | 5 | 5 | 5 | 5 | 5 | 5 | 5 | 5 | 5 | 5 | 5 |
| Benzoin isobutyl ether | 1.5 | — | — | — | — | — | — | — | — | — | — |
| Acyloin urethane | | | | | | | | | | | |

-continued

| Composition | 1 | 2 | 3 | 4 | 5 | 6 | 7 | 8 | 9 | 10 | 11 |
|---|---|---|---|---|---|---|---|---|---|---|---|
| Example I | — | 1.5 | — | — | — | — | — | — | — | — | — |
| Example II | — | — | 1.5 | — | — | — | — | — | — | — | — |
| Example III | — | — | — | 1.5 | — | — | — | — | — | — | — |
| Example IV | — | — | — | — | 1.5 | — | — | — | — | — | — |
| Example V | — | — | — | — | — | 1.5 | — | — | — | — | — |
| Example VI | — | — | — | — | — | — | 1.5 | — | — | — | — |
| Example VII | — | — | — | — | — | — | — | 1.5 | — | — | — |
| Example VIII | — | — | — | — | — | — | — | — | 1.5 | — | — |
| Example IX | — | — | — | — | — | — | — | — | — | 1.5 | — |
| Example X | — | — | — | — | — | — | — | — | — | — | 1.5 |

The compositions are coated onto aluminum substrates to provide a wet film thickness of 1.5 mil. The coated substrates are cured by exposure under a nitrogen atmosphere to ultraviolet irradiation, employing as a power source 3 medium pressure mercury vapor lamps, at an intensity of 80 watts/cm at a line speed of 15.2 meters/minute. All compositions cure to mar-resistant surfaces in one pass.

EXAMPLE XVII

Analogously to Example XVI, coating compositions which are identical to those of Example XVI except that each contains 3 parts by weight benzophenone. The compositions are coated onto aluminum panels and subjected to ultraviolet irradiation in an oxygen-containing atmosphere, employing the same cure conditions as in Example XVI. All compositions cure to a mar-resistant finish having a high gloss in one pass.

EXAMPLE XVIII

Photocurable compositions are prepared from the following ingredients:

| Composition | A | B |
|---|---|---|
| Syrup B | 100 | 100 |
| 2-Ethylhexyl acrylate | 17 | 17 |
| Pentaerythritol triacrylate | 5 | 5 |
| Benzophenone | 3 | 1.5 |
| Benzoin isobutyl ether | 1 | — |
| In situ cook blend of benzophenone photosensitizer and benzoin/4,4'-methylene-bis-(cylohexyl isocyanate) photoinitiator at a 2:1 ratio | — | 2.0 |

The compositions are stored at 60° C. Gelation of composition A occurs after 12 days; whereas gelation of composition B requires more than 25 days.

The data demonstrate the ability of the novel photoinitiators to effect curing upon exposure to ultraviolet irradiation in both inert and oxygen-containing environments to afford products possessing properties at least equivalent to those obtained by the prior art.

What is claimed is:

1. An acyloin urethan compound having the structure

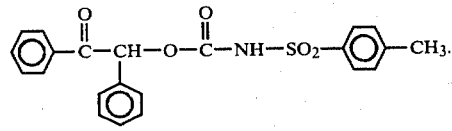

2. An acyloin urethan compound having the structure

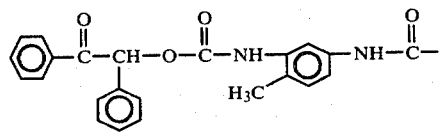

or

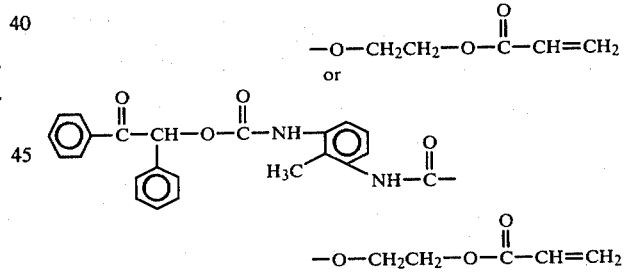

* * * * *